US012442220B1

(12) United States Patent
Gokcebay et al.

(10) Patent No.: US 12,442,220 B1
(45) Date of Patent: Oct. 14, 2025

(54) ELECTRONICALLY OPERATED LATCH

(71) Applicant: Digilock Asia Ltd., Lai Chi Kok (HK)

(72) Inventors: T. Asil Gokcebay, Petaluma, CA (US); Ali Ozhan, Petaluma, CA (US); An Zhang, Shaoguan (CN)

(73) Assignee: Security People, Inc., Houston, TX (US)

( * ) Notice: Subject to any disclaimer, the term of this patent is extended or adjusted under 35 U.S.C. 154(b) by 123 days.

(21) Appl. No.: 18/310,859

(22) Filed: May 2, 2023

Related U.S. Application Data

(63) Continuation-in-part of application No. 17/207,487, filed on Mar. 19, 2021, now Pat. No. 11,749,040, and a continuation-in-part of application No. 16/879,642, filed on May 20, 2020, now Pat. No. 11,690,924, and a continuation-in-part of application No. 16/854,390, filed on Apr. 21, 2020, now Pat. No. 11,615,667.

(51) Int. Cl.
*E05B 47/00* (2006.01)
*E05B 41/00* (2006.01)

(52) U.S. Cl.
CPC .......... *E05B 47/0012* (2013.01); *E05B 41/00* (2013.01); *E05B 2047/0069* (2013.01); *E05B 2047/0084* (2013.01)

(58) Field of Classification Search
CPC ................. E05B 47/0012; E05B 41/00; E05B 2047/0013; E05B 2047/0069; E05B 2047/0084; E05B 2047/0085
USPC .......................................................... 70/279.1
See application file for complete search history.

(56) References Cited

U.S. PATENT DOCUMENTS

| | | | | | |
|---|---|---|---|---|---|
| 1,222,964 | A * | 4/1917 | Matchette | G07F 9/06 | 232/1 R |
| 1,362,949 | A * | 12/1920 | Lillard | A47G 29/1201 | 232/25 |
| 1,574,354 | A * | 2/1926 | Barth | A47G 29/1201 | 232/25 |
| 1,642,533 | A * | 9/1927 | Beer | A47G 29/1201 | 312/292 |
| 1,709,363 | A * | 4/1929 | Murphy | A47G 29/1201 | 232/24 |
| 2,563,094 | A * | 8/1951 | Becker | A47B 87/02 | 312/211 |
| 2,658,667 | A * | 11/1953 | Mirkin | A47G 29/1201 | 232/23 |
| 3,784,089 | A * | 1/1974 | Koch | A47G 29/1201 | 232/24 |
| 3,790,244 | A * | 2/1974 | Stackhouse | E05B 11/00 | 70/DIG. 17 |
| 4,836,352 | A * | 6/1989 | Tateno | G07F 17/26 | 194/215 |

(Continued)

*Primary Examiner* — Nathan Cumar

(57) ABSTRACT

An electronically operated locking device and associated system of lockers is disclosed. The system of lockers may contain multiple locking devices, some of which may be connected to each other via hardwiring in daisy chain fashion. A module may distribute instructions to the locking devices, and the module may be connected to a controller, which may in turn be connected to the internet. A personal computing device such as a tablet may provide an interface for an end user to address the locking devices and may be connected wirelessly to the controller, and the controller may provide instructions to the module.

20 Claims, 14 Drawing Sheets

(56) References Cited

U.S. PATENT DOCUMENTS 5,172,970 A * 12/1992 Momose ............. E05B 47/0002 292/201
5,520,450 A * 5/1996 Colson, Jr. .......... G07F 17/0092 340/5.5
5,774,053 A * 6/1998 Porter .................. A47G 29/141 340/568.1
6,247,641 B1 * 6/2001 Noblet ............... A47G 29/1201 232/24
6,296,181 B1 * 10/2001 Noblet ............... A47G 29/1201 232/24
7,748,606 B2 * 7/2010 Mikolajczyk ....... E05B 17/2088 70/416
8,689,591 B2 * 4/2014 Elsner ................. E05B 47/0607 292/201
9,554,646 B1 * 1/2017 Charette .............. A47G 29/141
9,745,130 B1 * 8/2017 Rawal ................ G06Q 10/0875
10,439,408 B1 * 10/2019 Bastiyali ............... H02J 7/0044
10,474,797 B2 * 11/2019 Lowenthal .............. G07F 9/001
10,719,804 B1 * 7/2020 Lundahl ............. G07C 9/00896
11,410,118 B2 * 8/2022 Fee .................... G07C 9/00896
2005/0179349 A1 * 8/2005 Booth ...................... G07C 9/27 312/257.1
2010/0026452 A1 * 2/2010 Wilms ..................... G07C 9/27 340/5.73
2012/0062362 A1 * 3/2012 Rudduck ................. G07F 17/13 340/5.64
2015/0120601 A1 * 4/2015 Fee .................... G06Q 10/0836 705/339
2015/0179006 A1 * 6/2015 Von Zurmuehlen .... G07F 17/12 340/5.54
2015/0356801 A1 * 12/2015 Nitu ................... G07C 9/00904 340/5.61
2016/0066732 A1 * 3/2016 Sarvestani ........... A47G 29/141 232/24
2017/0061373 A1 * 3/2017 Hara .................. G06Q 10/0836
2017/0116571 A1 * 4/2017 Tammattabattula ......................... G06Q 10/0836
2017/0215620 A1 * 8/2017 Dade ........................ F25D 17/00
2017/0286905 A1 * 10/2017 Richardson ........ G06Q 10/0836
2018/0091503 A1 * 3/2018 Tang .................. G07C 9/00912
2018/0101820 A1 * 4/2018 Peynet ................... G06Q 10/08
2018/0182189 A1 * 6/2018 Lakshmi-Ratan ..... G07C 9/253
2018/0190054 A1 * 7/2018 Perez ................. G07C 9/00309
2018/0298640 A1 * 10/2018 Caterino ................. E05B 15/02
2018/0372447 A1 * 12/2018 Hyde ...................... E05B 47/00
2019/0026968 A1 * 1/2019 Tartal ...................... E05B 77/48
2019/0051090 A1 * 2/2019 Goldberg ........... G06Q 20/3278
2019/0114485 A1 * 4/2019 Chan .................. H04N 21/4662
2019/0313828 A1 * 10/2019 Schmider ................ E05G 1/024
2019/0333304 A1 * 10/2019 Flynn ................... G06Q 20/327
2020/0012245 A1 * 1/2020 Marin Pulido .... G06Q 10/0836
2020/0066077 A1 * 2/2020 Hara .................. G07C 9/00912
2020/0250614 A1 * 8/2020 Zhu .................... G06Q 10/0836
2020/0394857 A1 * 12/2020 Lin .................... G07C 9/00896
2020/0408028 A1 * 12/2020 Schmider .................. E05G 1/08
2020/0410797 A1 * 12/2020 Gomez Santamaria ..................... G07C 9/00912
2021/0000275 A1 * 1/2021 Excoffier ............. G07G 1/0063
2021/0235891 A1 * 8/2021 Derosa ................... G05B 15/02
2021/0259449 A1 * 8/2021 Roselló Ciscar ..... G07F 9/0235
2021/0327185 A1 * 10/2021 Shelton .................... G07C 9/23
2022/0051514 A1 * 2/2022 Schmidt .................. G07F 9/001
2022/0068078 A1 * 3/2022 Schmidt ............... G06Q 20/202
2022/0084338 A1 * 3/2022 Mitris ...................... G07C 9/21
2022/0101258 A1 * 3/2022 Fujisawa .................. G07C 9/22
2022/0170989 A1 * 6/2022 Froissart ............ G07C 9/00309
2022/0335758 A1 * 10/2022 Tazume ................. G06Q 50/10

* cited by examiner

ELECTRONICALLY OPERATED LATCH

CROSS REFERENCE TO RELATED APPLICATIONS

This application is a continuation-in-part of and claims priority to U.S. application Ser. No. 17/207,487, filed on Mar. 19, 2021, which is a continuation-in-part of U.S. application Ser. No. 16/879,642, filed on May 20, 2020, which is a continuation-in-part of U.S. application Ser. No. 16/854,390, filed on Apr. 21, 2020, which claims priority to both U.S. Provisional Application No. 62/953,848, filed on Dec. 26, 2019 and U.S. Provisional Application No. 62/841,073, filed on Apr. 30, 2019.

FIELD OF THE DISCLOSURE

The present disclosure relates to locks that can be released electronically and remotely controlled, in particular to such locks operable with furniture such as cabinets, drawers, and the like.

BACKGROUND

Latch assemblies are relied on in many applications for securing items stored within an item of furniture. For example, containers, cabinets, closets, drawers, compartments, lockers, and other forms of items of furniture may be secured with a latch. In many applications, an electrically operated latch is desirable due to the need for remote or push-button entry, coded access, keyless access, or monitoring of access. Various latches for panel closures have been employed where a moveable element or panel—such as a swinging door, drawer or the like—is to be fastened or secured to a stationary panel, doorframe, cabinet, or compartment body. Although many latch assemblies are known in the prior art, none are seen to teach or suggest the unique features of the latch assembly disclosed herein or to achieve its advantages.

DETAILED DESCRIPTION

Figure 1:
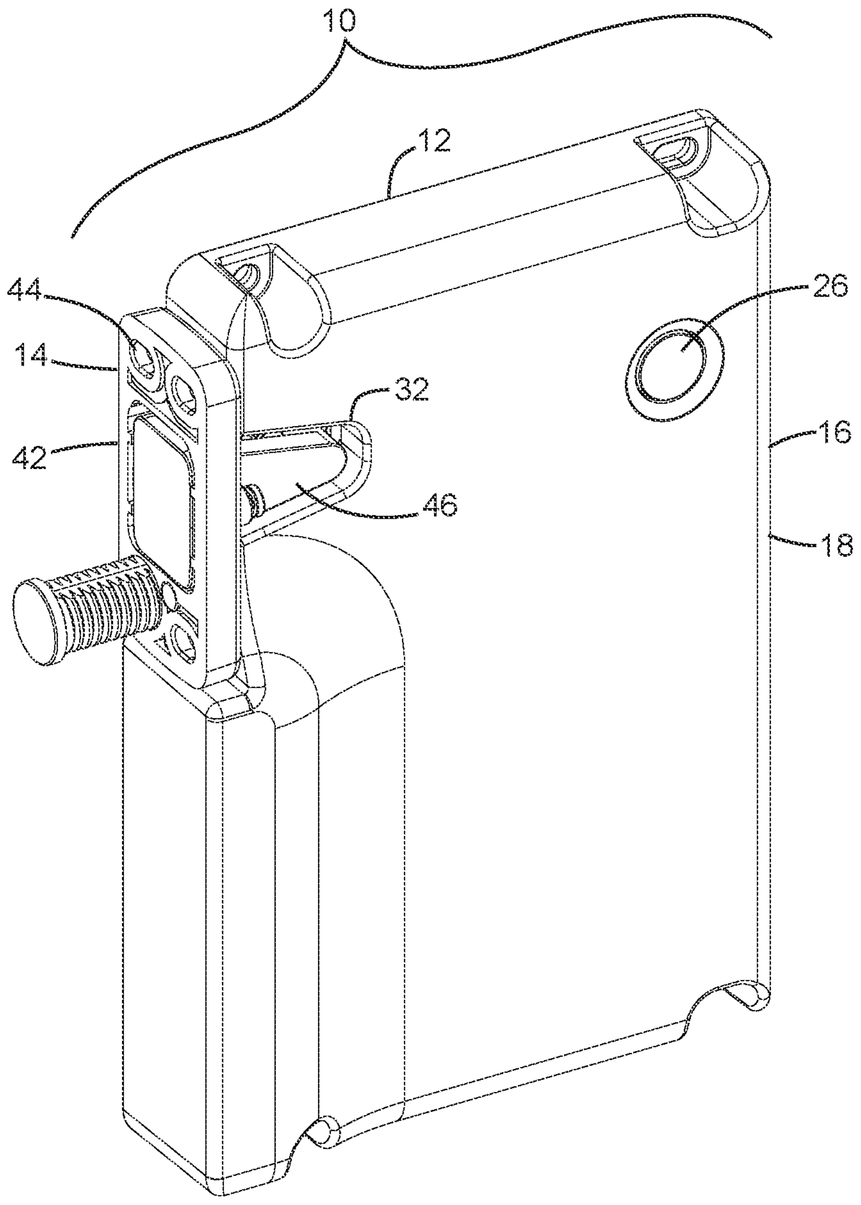
FIG. 1 is a front perspective view of a locking system in the latched position.
Figure 2:
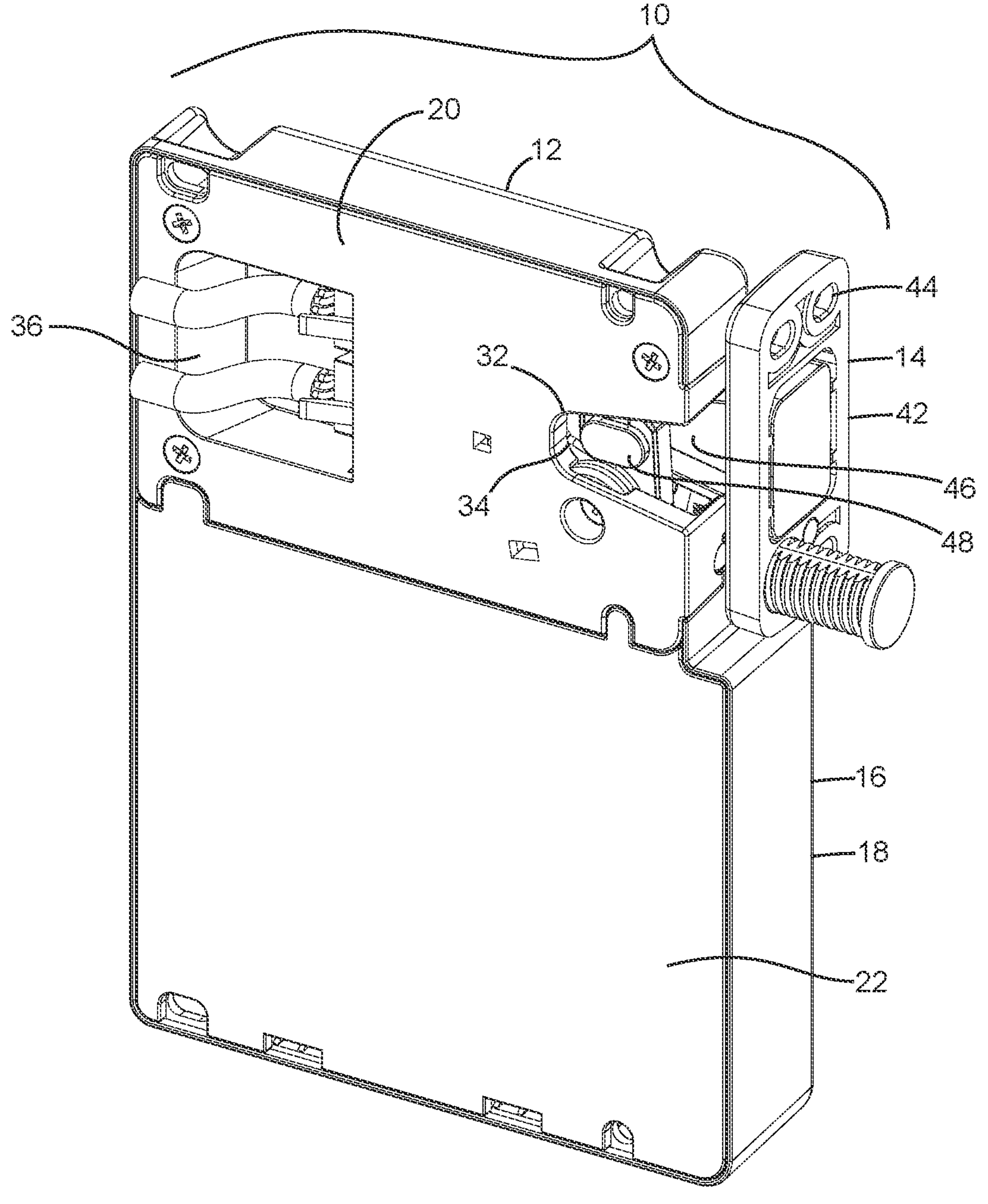
FIG. 2 is a rear perspective view of the locking system of FIG. 1 in the latched position.

FIGS. 1 and 2 depict an electronically operated locking system 10 including a lock 12 and a strike 14. The lock 12 may be mounted on the interior of a cabinet, drawer frame, or other item of furniture. The strike 14 may be mounted on the inside of a door, drawer, or other movable panel associated with the item of furniture. The lock 12 may selectively engage the strike 14 to secure the door, drawer, or panel in a closed position.

Figure 3:
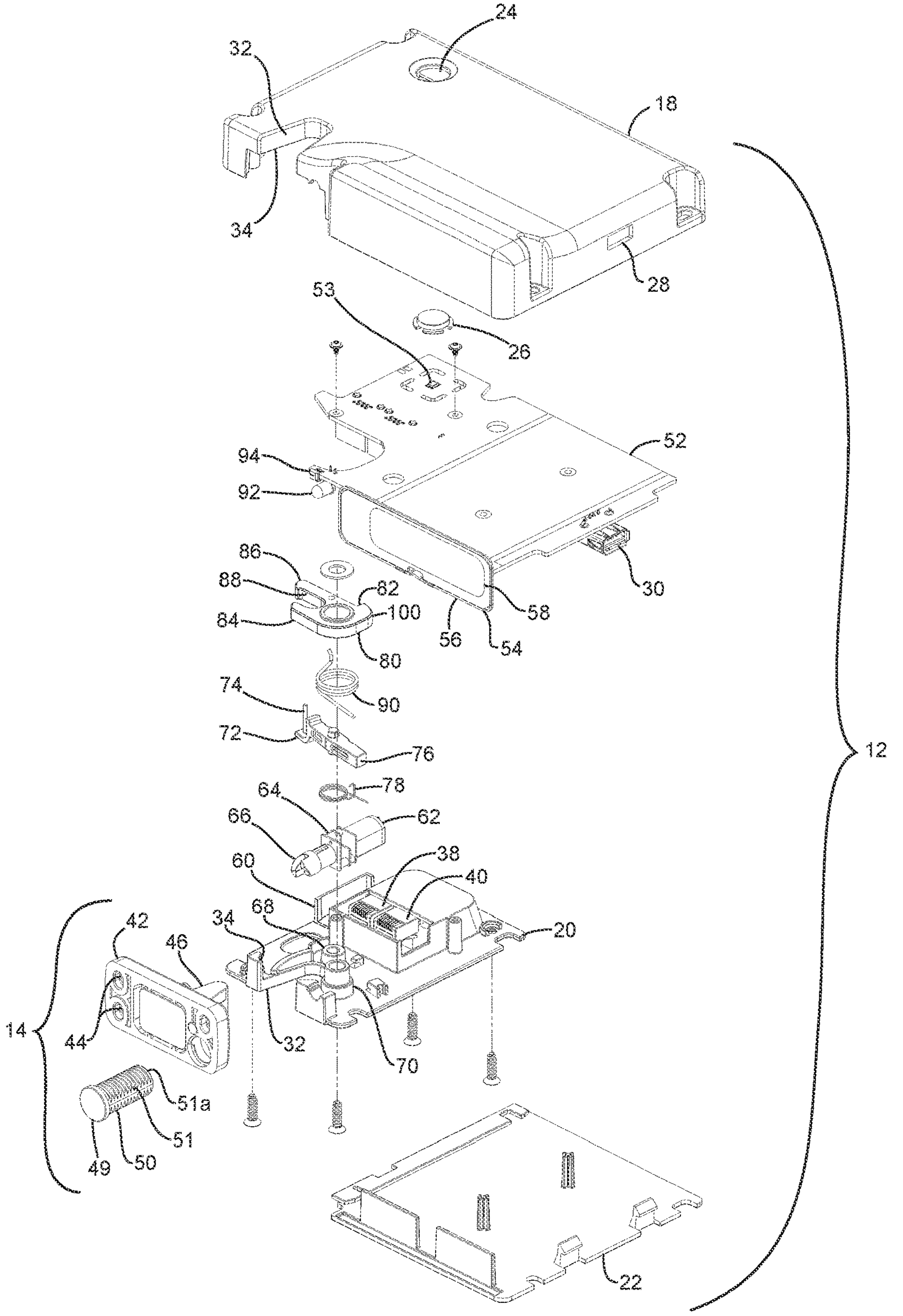
FIG. 3 is an exploded view of the locking system of FIG. 1.
Figure 3A:
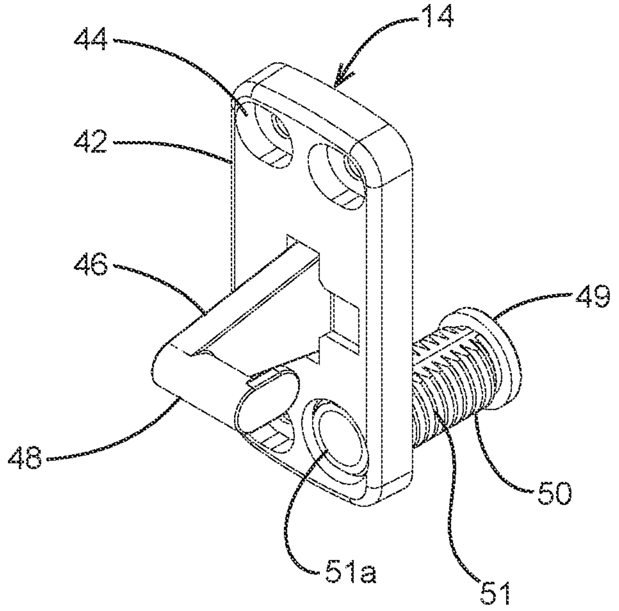
FIG. 3*a* is a detail perspective view of a strike of the locking system of FIG. 1.

Referring now additionally to FIGS. 3 and 3*a*, the lock 12 and the strike 14 are shown in an exploded view, and the strike 14 is shown in a detailed view, respectively. The lock 12 includes a housing 16 having an outer housing 18, a first inner housing 20, and a second inner housing 22, which cooperate to at least partially enclose the elements of the lock 12. The outer housing 18 includes a first opening 24 in which a lens 26 is disposed for providing illumination within the item of furniture such as a locker or cabinet. The outer housing 18 further includes a second opening 28 for providing access to a USB port 30 to allow, for example, charging of electronic devices within the item of furniture or otherwise providing direct electronic access to the lock 12 for, in one example, uploading or downloading files to and from the lock 12. The outer housing 18 and the first inner housing 20 cooperate to form a recess 32, and a slot 34 is formed in the recess 32 that assists in locking action, as will be described more below. The first inner housing 20 further includes an inset 36 that provides access to a first port 38 and a second port 40. In this example the ports 38, 40 are RJ-45 ports which can receive RJ-45 plugs and transmit both data and power. In this example, the first port 38 receives data and power, while the second port 40 can transmit the data and power to a second lock in daisy chain fashion.

The strike 14 includes a strike plate 42 with a plurality of through holes 44 that are used to mount the strike 14 to the furniture panel with fasteners such as screws (not shown). The strike 14 further includes a riser 46 and a strike bar 48 that is sized and shaped to be received in the recess 32. The strike 14 also includes a cylinder 50 that is sized to extend through the furniture panel, the cylinder 50 including a window 49 visible from the exterior of the furniture panel. A light signal can be transmitted from inside the furniture item and along the interior length of the cylinder 50 to the window 49 to the outside of the furniture such that it is visible to the user. The signal may provide confirmation of lock status, an error message, or the like. The cylinder 50 includes threading 51 such that the cylinder 50 may be screwed into the strike plate 42 to different depths to accommodate different thicknesses of panels to which the strike plate 42 is mounted, and if any end portion 51*a* of the cylinder 50 extends through the strike plate 42 into the interior of the furniture item, the end portion 51*a* can simply be cut off.

The lock 12 further includes a main board 52, which can include one or more processors, which should be understood broadly and includes, without limitation, one or more microprocessors, microcontrollers, gate arrays, discrete logic, and analog components. The main board can further include memory and one or more wireless antennas and readers to assist in controlling operation of the lock 12. The antennas and readers may include, without limitation, RFID, Bluetooth, NFC, LoRa and/or wireless internet. The processor (s) is in communication with the first and second ports 38, 40. Disposed on the main board 52 is an LED 53 that can provide light through the lens 26 to illuminate the interior of the furniture item. Also disposed on the main board 52 is the USB port 30 that can be accessed through the second opening 28 of the outer housing 18 and can, as described above, provide power to recharge electrical devices and/or provide access to the lock 12 to either download or upload data and/or files to the lock 12.

A second board 54 may be coupled to the main board 52. Disposed on the second board 54 may be an antenna 56 such as an RFID antenna, as well as a capacitive sensor 58. The RFID antenna 56 may receive a signal from, e.g., an RFID tag, as is known, which may comprise a credential to operate the lock 12. The capacitive sensor 58 may be used to wake the lock 12 from a sleeping state, as is known, to save power. The second board 54 may be perpendicular to the main board 52 such that when the lock 12 is mounted to the item of furniture, the RFID antenna 56 and the capacitive sensor 58 are each oriented toward an end user. Although an RFID antenna is shown here, other antennas and processes for transmitting an electronic credential, such as Bluetooth, BLE, LoRa, NFC, and wireless internet may also be used.

The first inner housing 20 includes a motor seat 60 in which an electric motor 62, a speed reducer 64, and a cylinder cam 66 are disposed. The first inner housing 20 further includes a first pivot seat 68 defining a first axis 69 and a second pivot seat 70 defining a second pivot axis 71. Disposed on the first pivot seat 68 is a trigger 72 having a cross bar 74 and a face 76. The trigger 72 may be pivoted about the first pivot seat 68 and the first axis 69 between a locked position and an unlocked position. A torsional trigger spring 78 is mounted to the first inner housing 20 and the trigger 72 and it biases the trigger 72 in a clockwise direction to the locked position. The cross bar 74 is disposed against the cylinder cam 66 such that rotation of the cylinder cam 66 by the motor 62 forces the trigger 72 in a counterclockwise direction against the force of the trigger spring 78 and to the unlocked position.

Disposed on the second pivot seat 70 is a latch 80 having a shoulder 82 and first and second fingers, 84, 86 defining a latch recess 88. The latch recess 88 is sized and shaped to receive the strike bar 48. The latch 80 is pivotable about the second pivot seat 70 and the second axis 71 between a latched position and an unlatched position, and the fingers 84, 86 may pivot through the slot 34 in the housing recess 32, as is known. A torsional latch spring 90 is mounted to the first inner housing 20 and the latch 80, and it biases the latch 80 in a counterclockwise direction to the unlatched position. The trigger 72 is located such that when the face 76 of the trigger 72 bears against the shoulder 82 of the latch 80, the latch 80 is locked in the locked and latched position, as will be discussed further below.

The main board 52 further includes a feedback indicator 92, which in this case is an LED. The feedback indicator 92 is aligned with the cylinder 50 of the strike 14, such that when the feedback indicator 92 is illuminated, the light travels through the cylinder 50 and is visible by the user from outside the item of furniture. Finally, the main board 52 includes a strike proximity sensor 94 that is disposed opposite the strike 14. Accordingly, the strike proximity sensor 94 will indicate when the strike 14 is adjacent the lock 12.

Figure 4:
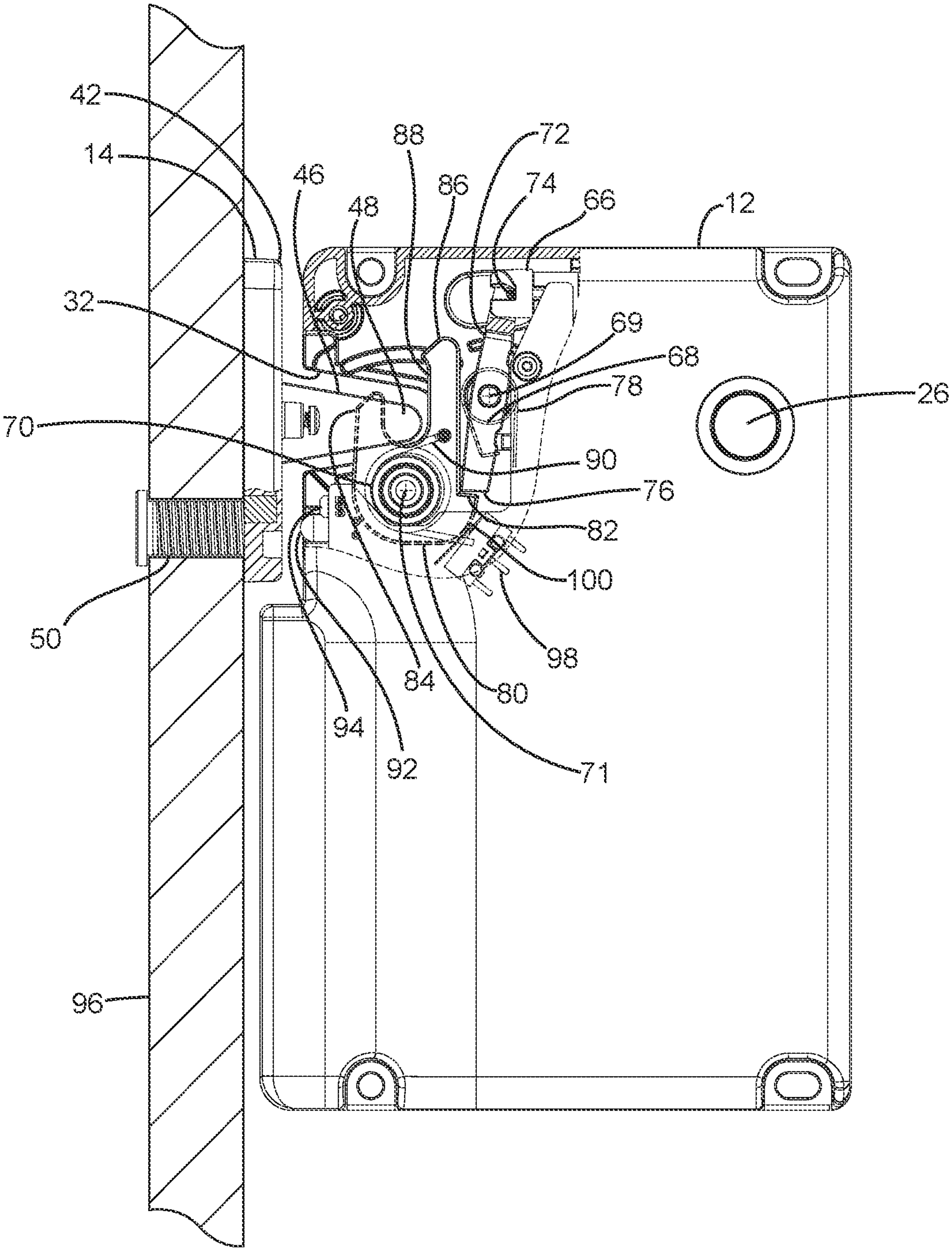
FIG. 4 is an elevation view of the locking system of FIG. 1, in partial cutaway, in the latched and locked position.

Referring now to FIG. 4, the lock 12 is shown in the locked and latched position, securing a panel 96 in a closed position. The panel 96 may be a panel of a drawer, a door of a cabinet or locker, or other closeable panel of an item of furniture. The trigger 72 is pivoted counterclockwise under the force of the trigger spring 78 such that the face 76 of the trigger 72 bears against the shoulder 82 of the latch 80 and the crossbar 74 of the trigger 72 is disposed at the base of the cylinder cam 66. The trigger 72 thereby prevents the latch 80 from rotating and maintains the latch 80 in the latched position. The strike bar 48 of the strike 14 is disposed in the recess 88 of the latch 80, whereby the first finger 84 prevents the strike 14 from exiting the recess 88, thereby securing the panel 96 to the lock 12.

FIG. 4 further discloses a switch 98 that is closed by a camming surface 100 of the latch 80 when the latch 80 is in the latched position, thus signaling to the lock 12 the position of the latch 80. In this position, the strike proximity sensor 94 is adjacent the strike plate 42, thereby signaling to the lock 12 that the strike 14 is adjacent. It further can be seen that the feedback indicator 92 is opposite the cylinder 50, and thereby light emitted by the feedback indicator 92 is directed down the cylinder 50 to the exterior of the panel 96 and provides a visual indication to the user. The feedback indicator 92 may provide a red illumination when the locker is occupied or in use, and a green illumination when the locker is free. Other indications, such as error conditions, and colors are of course possible.

Figure 5:
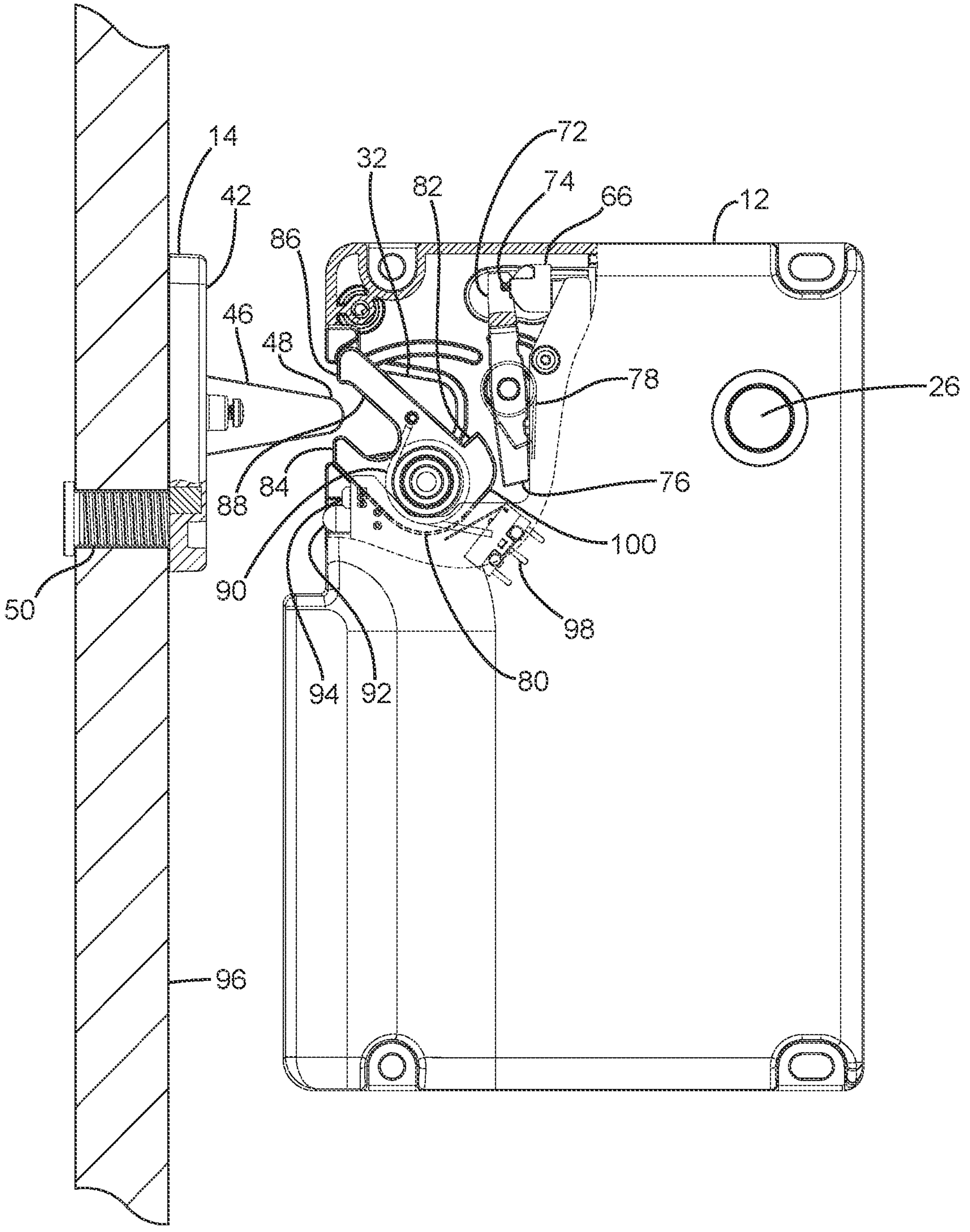
FIG. 5 is an elevation view of the locking system of FIG. 1, in partial cutaway, in the unlatched and unlocked position.

Referring now to FIG. 5, the lock 12 is shown in the unlocked and unlatched position. In this position, the end user has submitted an electronic credential via the RFID antenna 56, and the locking system 10 has determined that the credential is valid. Of course, the electronic credential may be received though other means, such as Bluetooth, NFC, wireless internet, and the like, or, as will be described later, via the first port 38. The processor has signaled the electric motor 62 to rotate, which rotates the cylinder cam 66 a quarter turn. This forces the cross bar 74 to ride up the surface of the cam 66, thereby pivoting the trigger 72 about the first pivot seat 68 in a counterclockwise direction. The face 76 of the trigger 72 is pivoted away from the shoulder 82 of the latch 80, thereby freeing the latch 80 to rotate. The force of the latch spring 90 throws the latch 80 in the counterclockwise direction thereby aligning the recess 88 of the latch 80 with the recess opening 32 of the outer housing 18 and first inner housing 20. The strike 14, and the panel 96 to which it is attached, can be forcibly pushed away from the lock 12 by the force of the latch spring 90. The latch switch 98 is then opened as the latch camming surface 100 retreats, informing the lock 12 that the latch 80 is in the unlatched position, and the strike proximity sensor 94 is opened, informing the lock 12 that the strike 14 is away from the lock 12.

Figure 6:
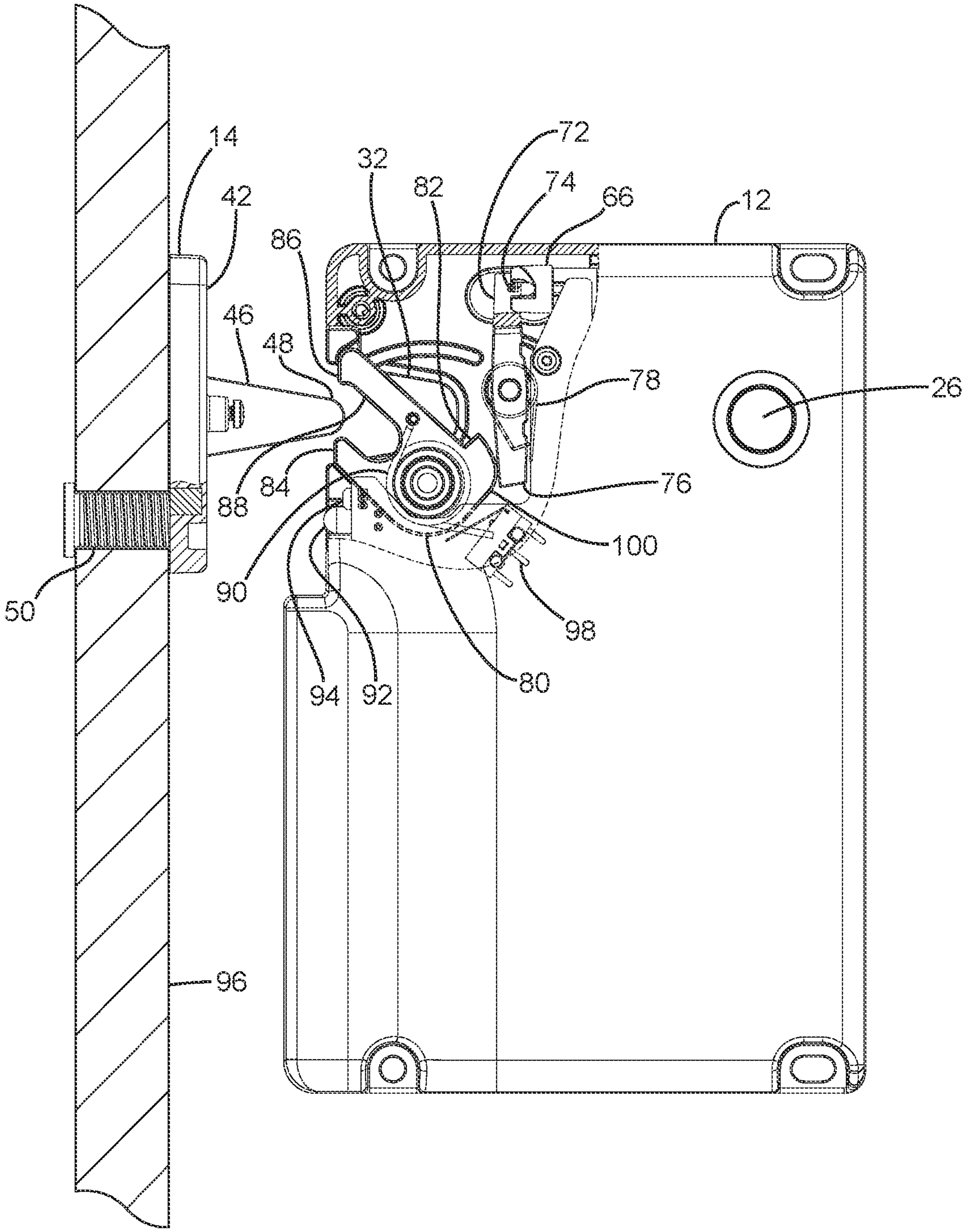
FIG. 6 is an elevation view of the locking system of FIG. 1, in partial cutaway, just prior to being locked and latched.

Referring now to FIG. 6, the lock 12 is in position for re-latching and re-locking. The motor 62 has rotated the cylinder cam 66 back to its position shown in FIG. 4. The trigger spring 78 is biasing the trigger 72 in the clockwise direction, but the latch camming surface 100 prevents clockwise rotation of the trigger 72. Upon insertion of the strike bar 48 into the latch recess 88 and against the second finger 86, the strike bar 48 causes the latch 80 to rotate in the clockwise direction until the position shown in FIG. 4. There, the trigger 72 no longer contacts the latch camming surface 100 and has pivoted in the clockwise direction under the force of the trigger spring 78 such that the face 76 of the trigger 72 again bears against the shoulder 82 of the latch 80, thereby preventing rotation of the latch 80 and securing the strike bar 48 within the recess 88 of the latch 80.

In certain embodiments, the motor 62 rotates the cylinder cam 66 back from its position in FIG. 5 back to its position shown in FIG. 6 after a predetermined amount of time, thus automatically placing the lock 12 back into position to be re-locked and relatched. In other embodiments, a user must provide the electronic credential a second time to direct the motor 62 to rotate the cylinder cam 66 back to the position of FIG. 4.

Figure 7:
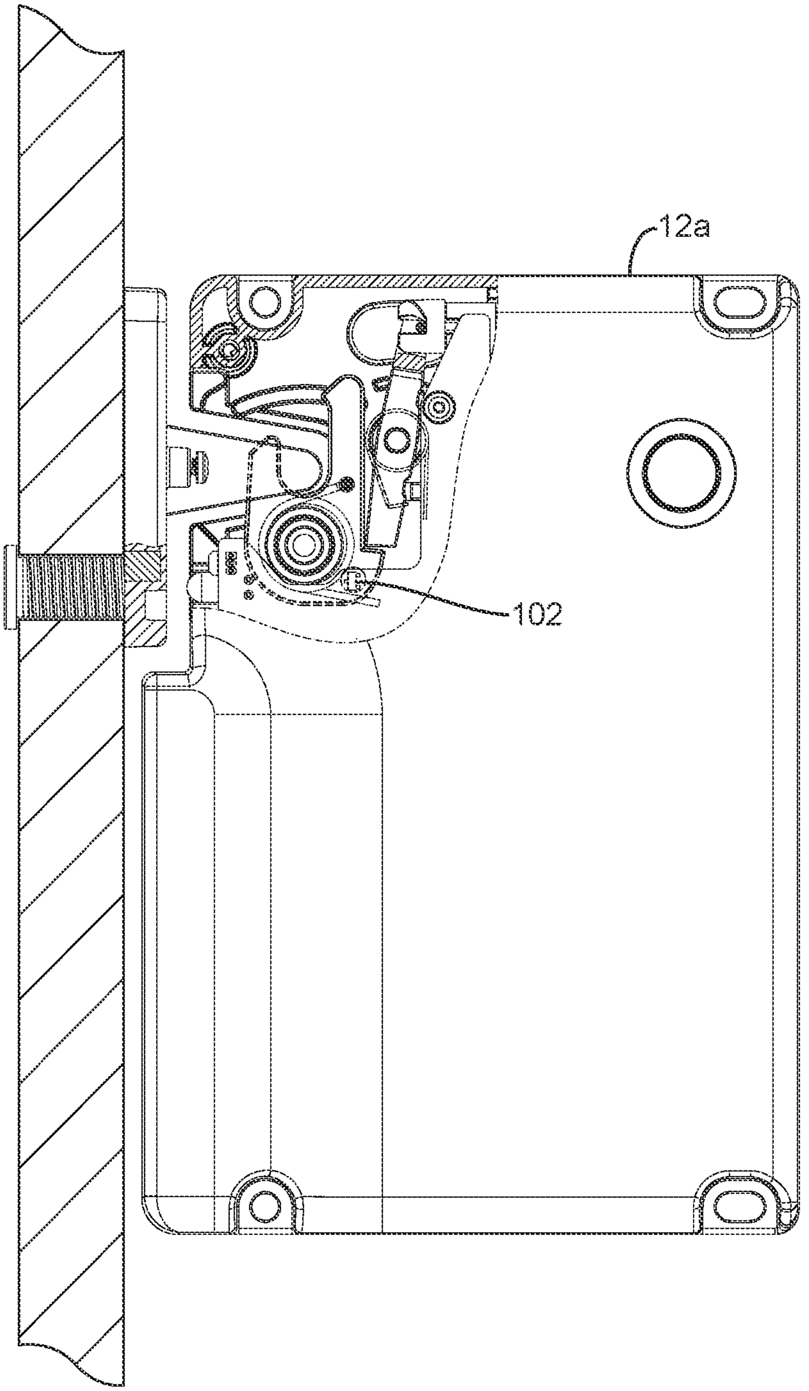
FIG. 7 is an elevation view of a second example of a locking system, in partial cutaway, in the latched and locked position.
Figure 8:
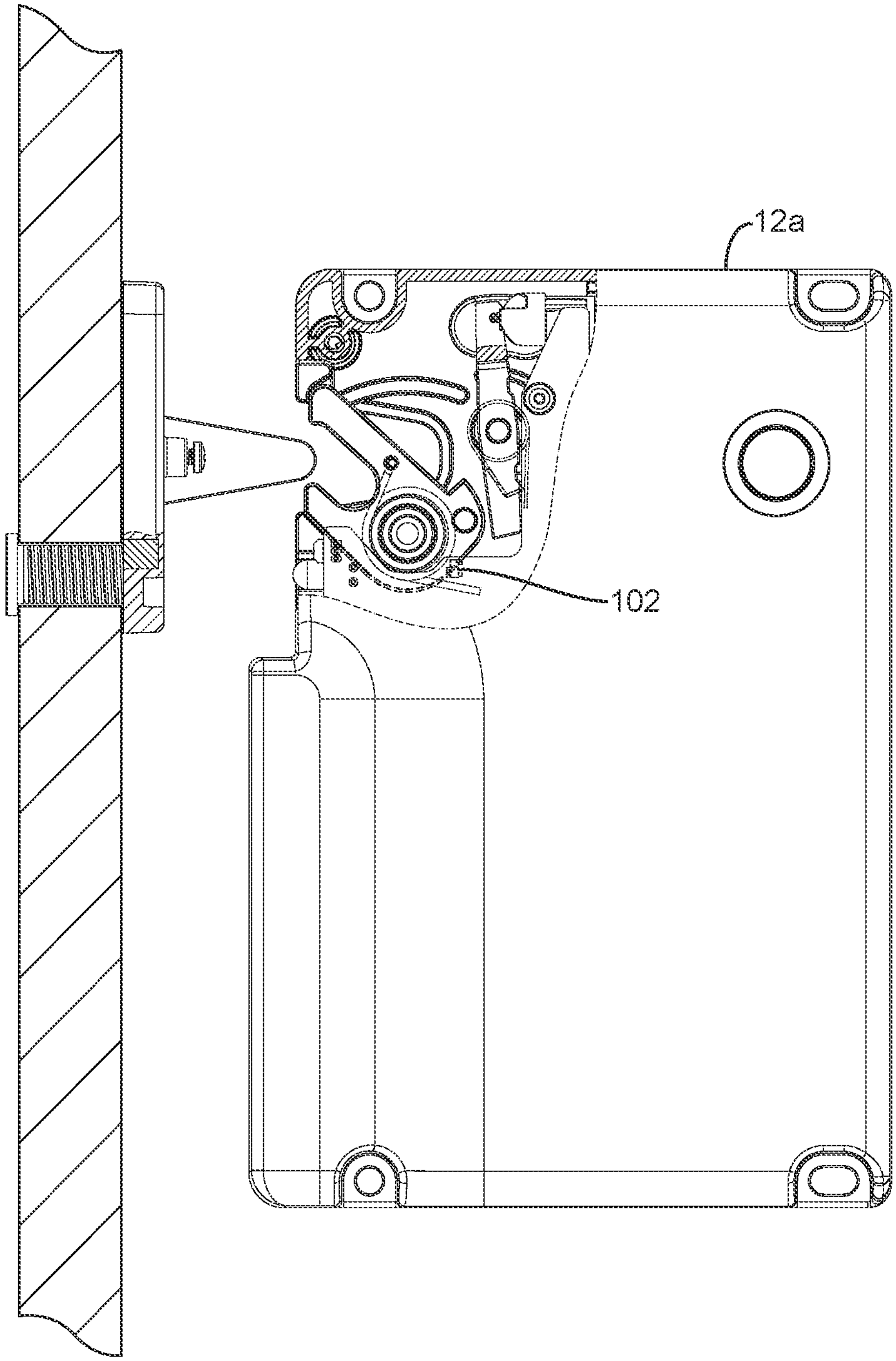
FIG. 8 is an elevation view of the locking system of FIG. 7, in partial cutaway, in the unlatched and unlocked position.

FIGS. 7 and 8 show an alternate embodiment of a lock 12*a* where the latch switch 98 of FIGS. 4-6 has been replaced with a latch proximity sensor 102. The latch proximity sensor 102 can be functionally equivalent to the latch switch 98 and provides feedback regarding the position of the latch 80. In all other aspects the lock 12*a* of FIGS. 7 and 8 is the same as the lock 12 of FIGS. 1-6.

The latch switch 98 (or latch proximity sensor 102), in combination with the strike proximity sensor 94, can provide added functionality to the locking system 10. In embodiments where the motor 62 automatically rotates the cylinder cam 66 to the position shown in FIG. 6. After a predetermined amount of time, an issue arises where a user may physically push the latch 80 into the latched position using their finger. Thus, the lock 12 is in the latched and locked position where the strike bar 48 is not contained within the recess 88 of the latch 80. This renders the lock 12 unusable until the user provides an electronic credential as described above to unlock the lock 12. To avoid this problem, the lock 12 may be configured such that the latch sensor 98, 102 reads that the latch 80 is in the latched position. But the strike proximity sensor 94 reads that the strike 14 is not adjacent the lock 12, and therefore that the strike bar 48 is not in the recess 88 of the latch 80. In this embodiment, the processor will direct the motor 62 to rotate the cylinder cam 66 back to the position of FIG. 5, thus pivoting the trigger 82 and pushing the face 76 of the trigger 82 off the shoulder 82 of the latch 80 and allowing the latch spring 90 to force the latch 80 in a counterclockwise direction into the unlatched position shown in FIG. 5. Thus, the lock 12 is placed automatically in the unlatched position if the lock 12 does not sense that the strike 14 is adjacent. In the examples disclosed herein, an electric motor 62 with a cylinder cam 66 is disclosed as the actuator, but other actuators may be employed, such as solenoids, mechanical linear cranks, worm gears, and so forth. Moreover, the processor is described as instructing the actuator to activate, which results in the rotation of the cylinder cam 66. But with other actuators, such as a solenoid, the activation of the actuator will result in other mechanics, as is known in the art. But such activation will result similarly in the shifting of the trigger 72.

Figure 9:
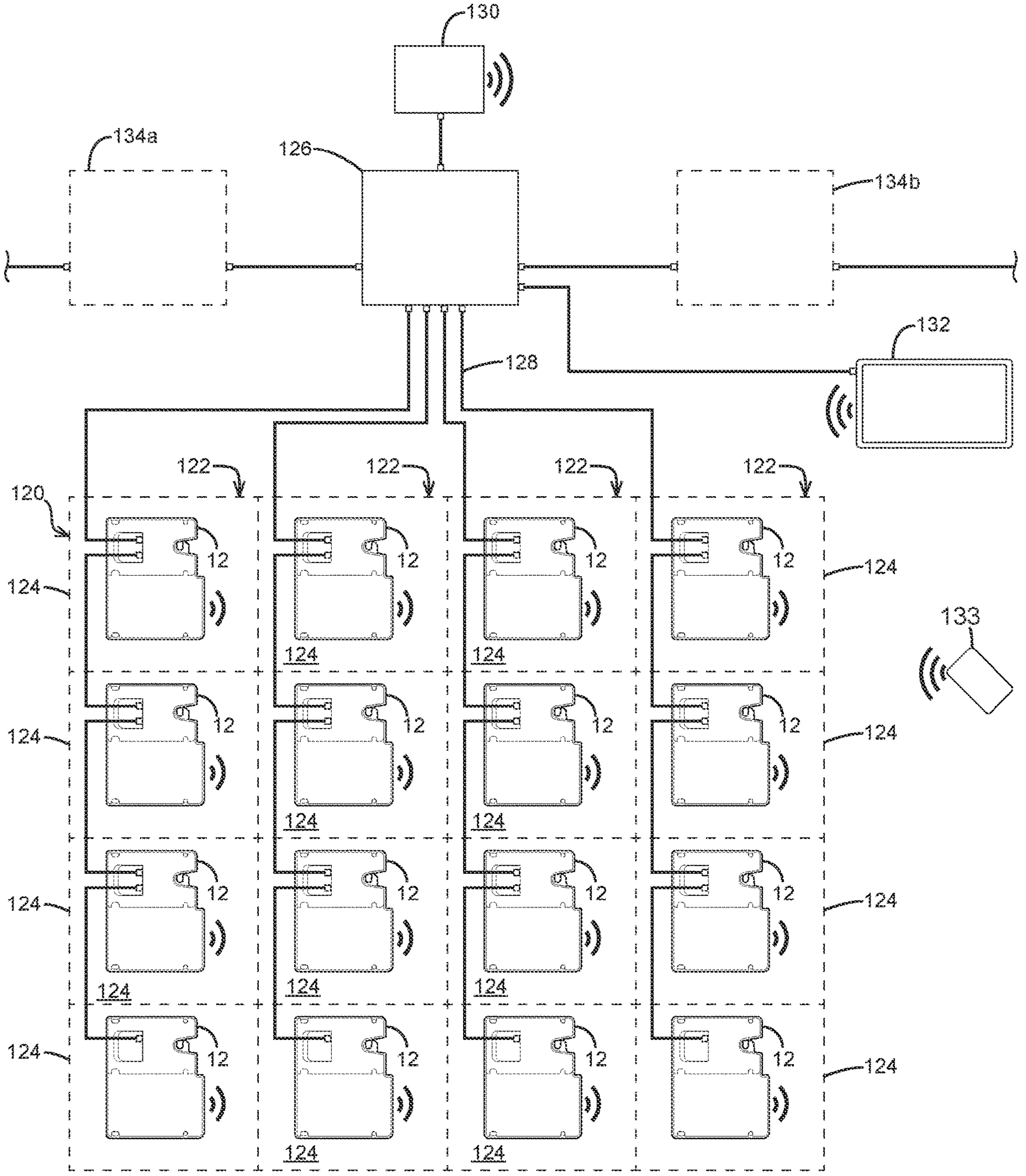
FIG. 9 is a block diagram of a multi-lock system incorporating the locking system of FIG. 1.

Referring now to FIG. 9, an exemplary locker bank 120 having four columns 122 of lockers 124, with each column 122 including four lockers 124, is disclosed. The locker bank 120, and each individual locker 124, is depicted in a simplified set of dashed lines as will be understood by one of ordinary skill. Each locker 124 includes a lock 12 similar to that disclosed above. Although lockers 124 are described, one or ordinary skill will understand that other items of furniture may be used consistent with this disclosure such as cabinets, drawers, and the like. The locker bank 120 includes a module 126 that provides power and data to each lock 12 over cabling 128. As discussed above, the locks 12 are connected via their respective RJ-45 ports 38, 40 in daisy chain fashion. The module 126 is further connected to a controller 130 that can be connected to the internet via hardwiring or a wireless antenna. The module 126 and controller 130 may be placed in, on, or around the locker bank 120, and they may be plugged into a convention wall outlet to receive power. Moreover, the module 126 and the controller 130 may be combined in a single housing. Further, the controller 130 may be connected to a cloud server via the internet, and the cloud server may be accessible worldwide for access by a remote administrator using, e.g., a personal computer, mobile telephone, or table, to the controller 130. The administrator may set credentials, download audit trails, review current usage, and so forth.

A tablet 132 can be included in the locker bank 120 and can be connected to the module 126 for line power. The tablet 132 can further be connected to the controller 130 via Bluetooth or other wireless means such as BLD, LoRa, and NFC. In certain embodiments, the tablet 132 may be incorporated into in the structure of the locker bank 120, and the user of the tablet 132 can control operations of each individual lock 12, can initiate the locks 12 into the system, and can download audit trails and other information of the usage of each individual lock 12. In other embodiments, the tablet 132 may be separate from the locker bank 120 and be powered by its internal battery. The tablet 132 can, in other embodiments, be a mobile device, cellular telephone, or personal computer, and any reference herein to a tablet shall be understood to encompass same. Moreover, in other embodiments, the tablet 132 could be connected to the controller 130 via cabling rather than wireless connection.

Figure 10:
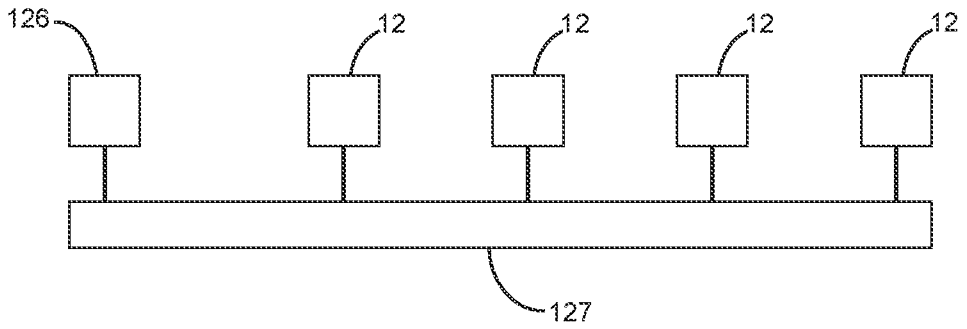
FIG. 10 is a block diagram of the communication system of the multi-lock system of FIG. 9.

In this, an end user may provide a credential or instruction to the tablet 132, which then wirelessly communicates with the controller 130, and the controller 130 sends an unlocking instruction to the module 126. As shown in FIG. 10, the module 126 then distributes the unlocking instruction to the column 122 of lockers 124 containing the targeted lock 12. The instruction will be transmitted from the module 126 to the first port 38 of the top-most lock 12 in the column 122, and to the processor of the top most lock 12. The top-most lock 12 will, in parallel, transmit the instruction to and out its second port 40 down the column to the next lock 12 in the column, and the instruction will propagate down the column in daisy-chain fashion. As depicted in FIG. 10, the controller 126 and locks 12 effectively form a bus 127 that transmits the instruction to each lock 12. To the extent that the instruction directs action by the top-most lock 12, that lock 12 will take the requested action. In certain other embodiments, the lock 12 to which an instruction is directed will perform the action, but may not continue transmitting the instruction down the daisy chain.

An end user of the lockers 124 may also operate a lock 12 using a credential transmitter 133 such as an RFID card, tag, a cellular telephone, or other known wireless credential provider. In this example, the lock 12 receives the credential from the transmitter 133 and transmits it to the module 126, which transmits it to the controller 130. The controller 130 then determines if the credential is valid, and if so, sends an unlocking instruction back to the lock 12 through the module 126 in the process described above. Where the controller 130 is connected to the internet and a cloud server, the locks 12 may be controlled and/or reviewed by an administrator using any internet-connected computer as discussed above.

The module 126 may be connected to secondary modules 134*a*, 134*b* that may transmit instructions for secondary locker banks in similar fashion, with one or more columns of lockers, and one or more lockers in each column. Thus, the controller 130 can control separate locker banks via each module 126, 134*a*, 134*b*. Further, administrators can easily maintain control of the locks 12 via the tablet 132, or even fully remotely via an internet-connected personal computer, while end users can use the locks 12 by employing RFID tags, NFC, Bluetooth, or other wireless connection via, e.g., a card or cell phone 133.

Figure 11:
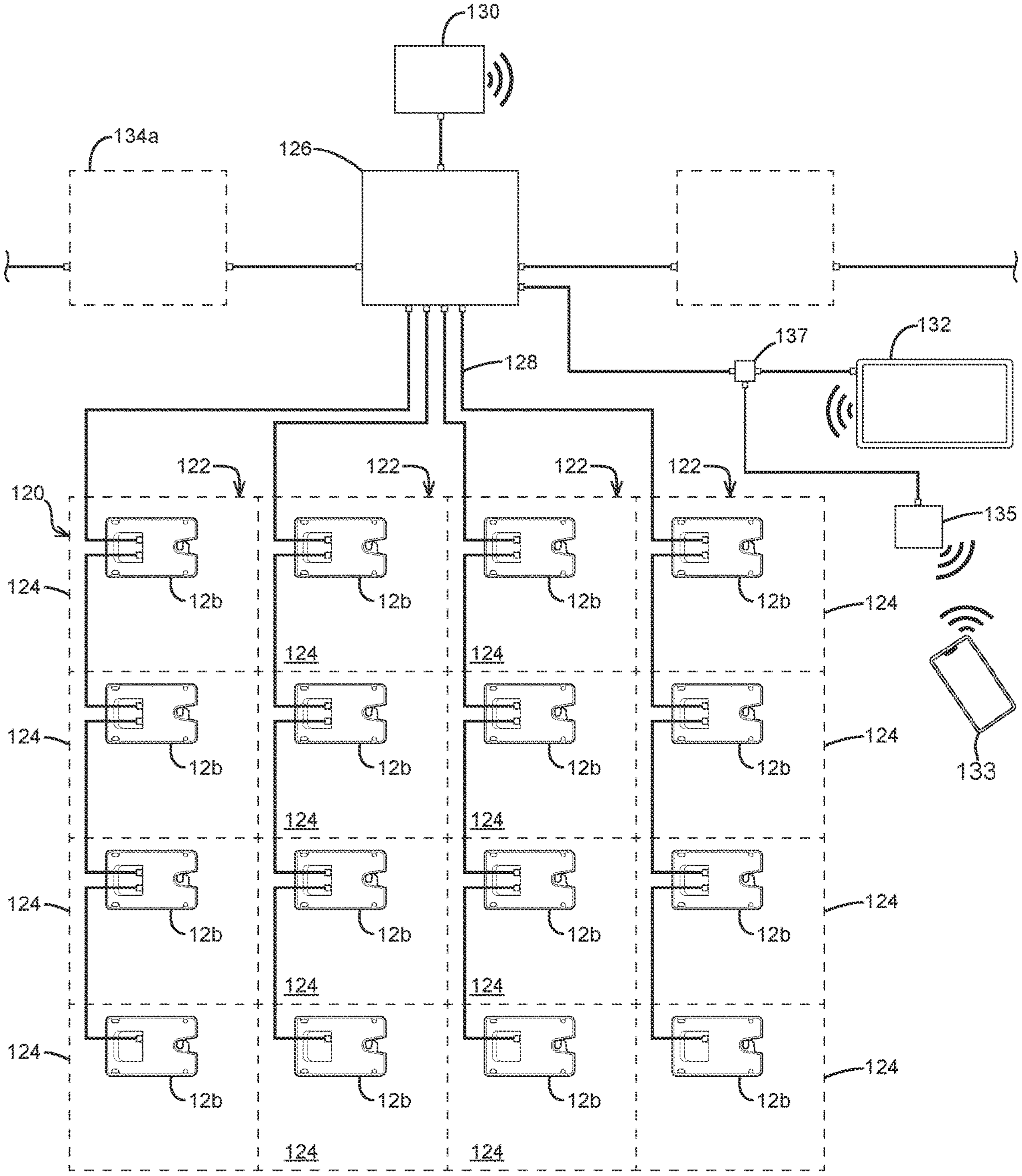
FIG. 11 is a block diagram of a second example of a multi lock system incorporating a third example of a locking system.

Referring now to FIG. 11, a second configuration of a locker bank 120 is disclosed. In this embodiment, the locker bank 120 includes locks 12*b* that are similar to locks 12 but do not include antennas, such as RFID antenna 56, for receipt of a wireless credential. This embodiment similarly includes a module 126, a controller 130, and the tablet 132. Administrative control and operation of the locks 12 is accomplished directly from the tablet 132 to the locks 12 themselves via the controller 130. Moreover, this example also includes a wireless reader 135 also receiving power from the module 126 though a USB hub 137. The reader 135 is configured to receive a wireless signal from card or cellular telephone 133, such as, without limitation, RFID. Upon receipt of the signal, the reader 135 transmits the signal to the tablet 132 through the USB hub 137, which then wirelessly transmits the signal to the controller 130.

The configurations of FIGS. 9 & 11 may work in assigned-use; in other words, an end user may be assigned a locker 124 and use that same locker 124 on a daily basis with the credential transmitter 133. No other credential will operate the user's locker 124. The configurations may also work in shared-use mode. Here, the user identifies the locker he or she wishes to use and presents his or her credential. The selected locker will pop open, and the user may store his or her items. To retrieve the items, the user re-enters the same credential, and the locker pops open again. The credential may then be deleted from memory.

Figure 12:
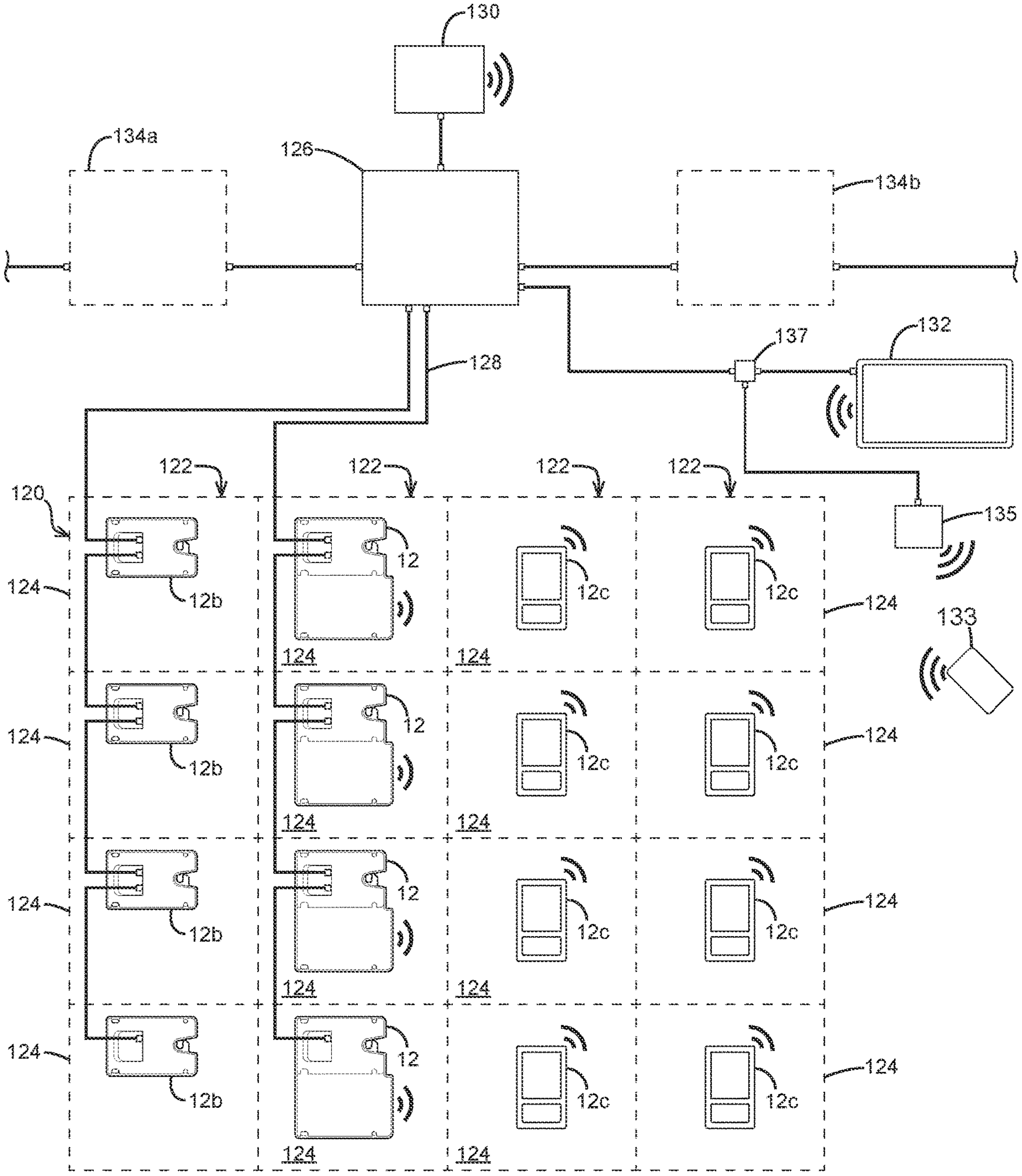
FIG. 12 is a block diagram of a third example of a multi lock system incorporating multiple examples of locking systems.

Referring now to FIG. 12, a third configuration of a locker bank 120 is disclosed. In this embodiment, the locker bank 120 includes locks 12 and 12*b* as described above and which operate in the same manner as described above, receiving power and data from the module 126 over cabling 128. The locker bank 120 may also include a third type of lock 12*c*, which may be battery powered and be able to communicate wirelessly with the controller 130 over Bluetooth, BLE, or other wireless transmission. In this embodiment, the lock 12*c* bypasses the module 126 and communicates wirelessly with the controller 130. Moreover, lock 12*c* may be operated by an end user who uses a credential transmitter 133 such as an RFID card, mobile device, or the like. The locks 12*c* may also be addressed remotely by an administrator accessing the controller 130 via the cloud server. Accordingly, the controller 130 has the flexibility to operate locks 12, 12*b*, 12*c* either wirelessly or wired, and a remote administrator may oversee all locks of the system.

Figure 13:
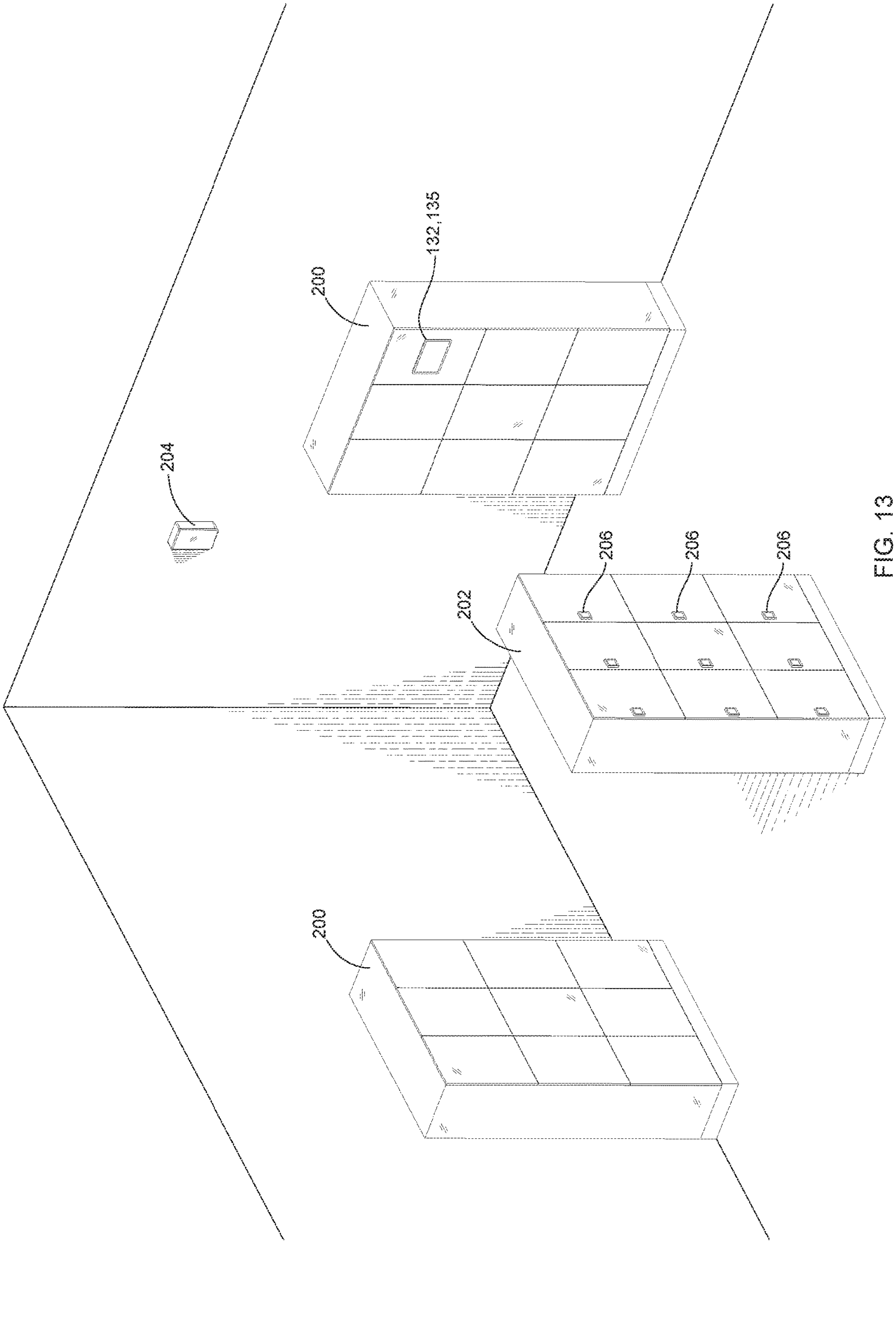
FIG. 13 is a perspective view of an implementation of the embodiment discussed in FIG. 12.

Referring now to FIG. 13, a simplified implementation of the teachings of FIG. 12 is disclosed. First locker banks 200 and a second locker bank 202 are disclosed. First locker banks 200 include locking systems 12 and 12*b* and a module 126 (all which are internal to the lockers and thus not visible). One or more of the first locker banks 200 may also include an integral tablet 132 and reader 135 accessible by the end user. A controller 204 is hardwired to the module(s) 126 within the locker banks 200, and the locker banks 200 may be plugged in to any standard wall outlet for continuous line power. The tablet 132 may communicate wirelessly with the controller 204 as discussed above.

Second locker bank 202 includes locks 206, which are the same wirelessly addressable locks as locks 12*c* and are individually battery powered. Second locker bank 206 does not include a module 126. The locks 206 may communicate directly with the controller 204 or they may communicate with the tablet 132. Second locker bank 202 is advantageous in that it does not need any hard wire cabling connected to it. Accordingly, the locker bank 202 can be placed as an attractive and useful room divider with no power or data cabling required, and during installation no trench need be dug in the floor to place cables.

Accordingly, in the system disclosed in FIG. 13, a first locker bank 200 can be placed against the wall and be powered by line power by plugging in to a standard outlet, while a second locker bank 202 can be placed in the middle of the floor, with no structural modifications needed and no cabling needed, and a single controller 204 can communicate with both, providing great flexibility and easy implementation for the user.

While various embodiments have been described above, it should be understood that they have been presented by way of example only, and not limitation. It will be apparent to persons skilled in the relevant art that various changes in form and detail can be made therein without departing from the spirit and scope of the invention. For example, acoustic data communication schemes can be conceived that combine all the techniques above. Thus, the breadth and scope of the present invention should not be limited by any of the above-described exemplary embodiments, but should be defined only in accordance with the following claims and their equivalents.

We claim:

1. An electronic locking device for an item of furniture, the electronic locking device comprising:

a housing having an opening;

an actuator at least partially disposed in the housing;

a trigger at least partially disposed in the housing and operatively coupled to the actuator, the trigger pivotable about a first axis between a locked position and an unlocked position, the actuator at least in part configured to shift the trigger between the locked position and the unlocked position, the trigger further including a face;

a latch at least partially disposed in the housing and having a recess, the latch pivotable about a second axis, the latch being pivotable between an unlatched position, where the recess is oriented toward the opening, and a latched position, the recess sized and shaped to receive a strike bar, the latch further including a shoulder, wherein when the latch is in the latched position and trigger is in the locked position, the face of the trigger bears on the shoulder and prevents the latch from pivoting to the unlatched position;

a processor disposed within the housing;

a first port accessible from outside the housing and in communication with the processor, the first port configured to receive an unlocking instruction and transmit the unlocking instruction for receipt by the processor; and a second port accessible from outside the housing, the second port configured for receipt of the unlocking instruction and to transmit the unlocking instruction for receipt by a second electronic locking device;

wherein the processor is configured to read the unlocking instruction and selectively instruct the actuator to activate.

2. The electronic locking device of claim 1, further comprising a strike, the strike including a strike plate for mounting to a piece of furniture and the strike bar, the strike bar shaped and sized to sit within the recess of the latch.

3. The electronic locking device of claim 2, further comprising a sensor positioned opposite the strike plate when the strike bar is positioned in the recess, the sensor configured to sense the proximity of the strike plate.

4. The electronic locking device of claim 1, further comprising a reader configured to receive a credential from an end user wirelessly.

5. The electronic locking device of claim 4, the reader comprising one or more of an RFID reader, a Bluetooth reader, a BLE reader, a LoRa reader, and an NFC reader.

6. The electronic locking device of claim 1, further comprising an indicator capable of emitting light for indicating lock status.

7. The electronic locking device of claim 6, further comprising a strike, the strike including a strike plate for mounting to a piece of furniture and the strike bar.

8. The electronic locking device of claim 7, the strike further including a cylinder for transmitting the light from the indicator though a sidewall of the item of furniture.

9. The electronic locking device of claim 8, the cylinder being externally threaded.

10. The electronic locking device of claim 1, the actuator comprising an electric motor and a cam, wherein rotation of the cam is configured to pivot the trigger about the trigger axis.

11. The electronic locking device of claim 1, wherein the trigger is spring loaded to the locked position and the latch is spring loaded to the unlatched position.

12. The electronic locking device of claim 1, the trigger comprising a bearing surface configured to engage the actuator, the first axis of the trigger disposed between the bearing surface and the face.

13. A system of electronic locking devices for one or more items of furniture, the system comprising:

a controller configured to communicate with a first locking device and a second locking device, the controller operatively coupled to the first locking device wirelessly, the controller operatively coupled to the second locking device by cabling, the controller configured to be connected to the Internet;

the first locking device including one or more antennas, the first locking device configured to receive a credential from a user, the first locking device powered by batteries; and the second locking device comprising a housing and one or more first ports accessible from outside the housing, the one or more input connectors configured to receive power and to communicate with the controller.

14. The system of claim 13, the first locking device disposed on a first item of furniture, the second locking device disposed on a second item of furniture.

15. An electronic locking device for an item of furniture, the device comprising:

a housing having an opening;

an actuator at least partially disposed in the housing;

a trigger at least partially disposed in the housing and operatively coupled to the actuator, the trigger pivotable about a first axis between a locked position and an unlocked position, the actuator at least in part configured to shift the trigger between the locked position and the unlocked position, the trigger further including a face;

a latch at least partially disposed in the housing and having a recess, the latch pivotable about a second axis, the latch being pivotable between an unlatched position, where the recess is oriented toward the opening, and a latched position, the recess sized and shaped to receive a strike bar of a strike, the latch further including a shoulder, wherein when the latch is in the latched position and trigger is in the locked position, the head of the trigger bears on the shoulder and prevents the latch from pivoting to the unlatched position;

a first sensor positioned opposite the strike when the strike bar is positioned in the recess, the first sensor configured to sense the proximity of the strike; and a processor disposed within the housing, the processor configured to receive a signal from the first sensor, the processor further configured to control the actuator.

16. The electronic locking device of claim 15, further comprising a second sensor positioned adjacent the latch, the second sensor configured to sense to position of the latch.

17. The electronic locking device of claim 16, the processor configured to instruct the actuator to shift the trigger from the locked position to the unlocked position when the first sensor fails to sense the strike and the second sensor senses the latch in the latched position.

18. The electronic locking device of claim 15, the actuator comprising an electric motor and a cam, wherein rotation of the cam produces the pivoting of the trigger about the first axis.

19. The electronic locking device of claim 15, further comprising an indicator capable of emitting light for indicating lock status.

20. The electronic locking device of claim 19, further comprising the strike, the strike including a strike plate for mounting to a piece of furniture and the strike bar, the strike further including a cylinder for transmitting the light from the indicator though a sidewall of the piece of furniture.

* * * * *